United States Patent
Kang et al.

(10) Patent No.: US 11,941,246 B2
(45) Date of Patent: Mar. 26, 2024

(54) MEMORY SYSTEM, DATA PROCESSING SYSTEM INCLUDING THE SAME, AND OPERATING METHOD THEREOF

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 69 days.

(21) Appl. No.: 17/506,414

(22) Filed: Oct. 20, 2021

(65) Prior Publication Data
US 2022/0391093 A1    Dec. 8, 2022

(30) Foreign Application Priority Data
Jun. 7, 2021    (KR) .......................... 10-2021-0073727

(51) Int. Cl.
*G06F 3/06*    (2006.01)
(52) U.S. Cl.
CPC .......... *G06F 3/0604* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 2017/0192902 A1* | 7/2017 | Hwang | ............... | G06F 12/0246 |
| 2018/0113615 A1* | 4/2018 | Park | ..................... | G06F 3/061 |
| 2019/0114272 A1* | 4/2019 | Dubey | ............... | G06F 12/0246 |
| 2019/0369909 A1* | 12/2019 | Li | ....................... | G06F 3/0656 |
| 2020/0089430 A1* | 3/2020 | Kanno | ................. | G06F 3/0679 |
| 2020/0371908 A1* | 11/2020 | Cariello | ............... | G06F 3/0688 |
| 2021/0294738 A1* | 9/2021 | Tadokoro | ............ | G06F 12/0246 |

FOREIGN PATENT DOCUMENTS

| | | |
|---|---|---|
| KR | 10-1754545 B1 | 7/2017 |
| KR | 10-2020-0114052 A | 10/2020 |
| KR | 10-2020-0133817 A | 11/2020 |

\* cited by examiner

*Primary Examiner* — Stephanie Wu
(74) *Attorney, Agent, or Firm* — IP & T GROUP LLP

(57) ABSTRACT

Disclosed are a data processing system comprising: a memory system for providing a host with a memory map segment including map pieces; and the host for storing the memory map segment as a host map segment and converting a logical address into a physical address using the host map segment. The memory system stores changed map pieces in a map cache, inserts the changed map pieces in a response to a first command, and provides the host with the response. The host updates the host map segment based on the changed map pieces. When a read command includes a logical address and a physical address, the memory system accesses a memory device using the physical address of the read command according to whether the logical address of the read command is stored in the map cache.

20 Claims, 10 Drawing Sheets

MEMORY SYSTEM, DATA PROCESSING SYSTEM INCLUDING THE SAME, AND OPERATING METHOD THEREOF

CROSS-REFERENCE TO RELATED APPLICATION(S)

The present application claims priority under 35 U.S.C. § 119(a) to Korean Patent Application No. 10-2021-0073727, filed on Jun. 7, 2021, the disclosure of which is incorporated herein by reference in its entirety.

BACKGROUND

1. Field

Various embodiments of the present disclosure generally relate to a memory system, a data processing system including the same, and an operating method thereof.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a technology that allows a host to provide a memory system with a request including a physical address of data to be read from the memory system, a data processing system including the same, and an operating method thereof.

In accordance with an embodiment of the present disclosure, a data processing system comprises: a memory system suitable for providing a host with a memory map segment including a plurality of map pieces each including a mapping relationship between a logical address and a physical address; and the host suitable for storing the memory map segment, which may be provided from the memory system, as a host map segment and converting a logical address into a physical address by using the host map segment. The memory system may further be suitable for: storing, in a map cache, one or more changed map pieces among the plurality of map pieces, inserting the changed map pieces in a response to a first command of the host, and providing the host with the response. The host may further be suitable for updating the host map segment based on the changed map pieces provided through the response. When a read command from the host may include a logical address and a physical address, the memory system may further be suitable for accessing a memory device by selectively using the physical address included in the read command according to whether the logical address included in the read command may be stored in the map cache.

When the logical address included in the read command may be not stored in the map cache, the memory system accesses the memory device by using the physical address included in the read command.

When the logical address included in the read command may be stored in the map cache, the memory system accesses the memory device by using a physical address that may be converted from the logical address included in the read command based on the changed map pieces stored in the map cache.

The memory system may further be suitable for removing the changed map pieces from the map cache when the updating of the host map segment may be completed.

The host may include a slot suitable for queueing the first command. The host may further be suitable for: removing the first command from the slot after the updating of the host map segment, queueing a second command in the slot, and providing the memory system with a doorbell signal indicating the slot. The memory system may further be suitable for: storing identification of the slot, and detecting completion of the updating of the host map segment by receiving the doorbell signal.

The memory map segment corresponds to a logical address region that may be frequently accessed over a threshold level.

The memory system may insert, together with the changed map pieces in the response, identification of the memory map segment and location information of the changed map pieces within the memory map segment.

The response may have a format of a response UFS protocol information unit (UPIU).

The memory system may further be suitable for providing the host with hint information on the memory map segment including the changed map pieces to cause the host to provide the memory system with a read buffer command, as the first command, in response to the hint information.

The response may have a format of a data in UFS protocol information unit (UPIU).

In accordance with an embodiment of the present disclosure, a memory system comprises: a memory device suitable for storing data; and a controller suitable for: providing a host with a memory map segment, which may include a plurality of map pieces each including a mapping relationship between a logical address and a physical address, as a host map segment, storing, in a map cache, one or more changed map pieces among the plurality of map pieces, causing the host to update the host map segment by inserting the changed map pieces in a response to a first command of the host and providing the host with the response, the host map segment being updated on the basis of the changed map pieces provided through the response, and accessing, when a read command from the host may include a logical address and a physical address, a memory device by selectively using a physical address included in the read command according to whether the logical address included in the read command may be stored in the map cache.

When the logical address included in the read command may be not stored in the map cache, the controller accesses the memory device by using the physical address included in the read command.

When the logical address included in the read command may be stored in the map cache, the controller accesses the memory device by using a physical address that may be converted from the logical address included in the read command based on the changed map pieces stored in the map cache.

The controller may further be suitable for removing the changed map pieces from the map cache when the updating of the host map segment may be completed.

The controller may further be suitable for: storing identification of a slot that may be included in the host and queues the first command, and detecting completion of the updating of the host map segment by receiving a doorbell signal indicating the slot. The doorbell signal may be provided from the host when the first command may be removed from the slot after the updating of the host map segment and a second command may be queued in the slot.

The memory map segment corresponds to a logical address region that may be frequently accessed over a threshold level.

The controller may insert, together with the changed map pieces in the response, identification of the memory map segment and location information of the changed map pieces within the memory map segment.

The response may have a format of a response UFS protocol information unit (UPIU).

The controller may further be suitable for providing the host with hint information on the memory map segment including the changed map pieces to cause the host to provide the controller with a read buffer command, as the first command, in response to the hint information.

The response may have a format of a data in UFS protocol information unit (UPIU).

In accordance with an embodiment of the present disclosure, an operating method of a data processing system comprises: providing, by a host, a storage system with a first command together with a map piece selected from a map segment copied therein from a storage system, the first command being queued in a slot within the host; updating, by the storage system, the map piece stored therein as a result of an operation thereof for the first command and the map piece provided from the host; providing, by the storage system, the host with the updated map piece together with location information of the map piece within the map segment through a response for the host; caching, by the storage system, the updated map piece therein; updating, by the host, the map piece copied therein based on the updated map piece provided from the storage system; and removing, by the storage system, the cached map piece based on information that the first command may be removed from the slot, the information being provided from the host.

The operating method may further comprise performing, by the storage system, an operation on a physical address within a map piece that may be provided together with a second command from the host and may include a logical address other than a logical address within the cached map piece.

The operating method may further comprise ignoring, by the storage system, a physical address within a map piece that may be provided together with a second command from the host and may include a logical address identical to a logical address within the cached map piece.

DETAILED DESCRIPTION

Hereinafter, various embodiments of the present disclosure will be described with reference to the accompanying drawings.

However, the present disclosure is not limited to the embodiments disclosed below, and may be implemented in various other forms. The disclosed embodiments are provided to make the present disclosure complete and to fully convey the scope of the present disclosure to those skilled in the art.

Figure 1:
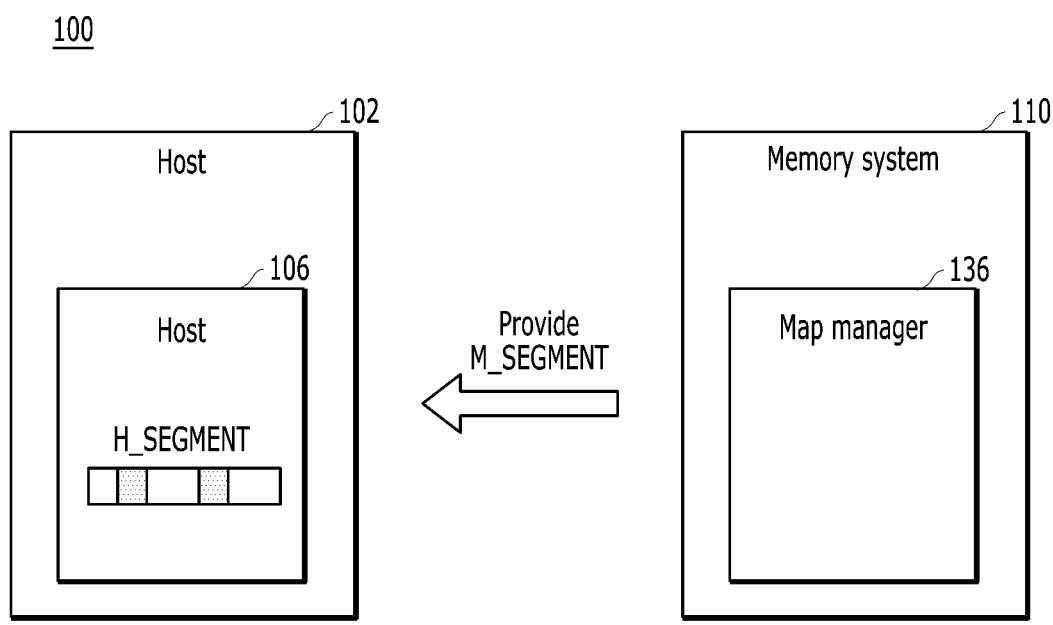
FIG. 1 is a diagram illustrating a method of sharing map data in accordance with an embodiment of the present disclosure.

FIG. 1 is a diagram illustrating a method of sharing map data in accordance with an embodiment of the present disclosure.

Referring to FIG. 1, a host 102 and a memory system 110 may interwork with each other. The host 102 may be understood as a computing device, and implemented in the form of a mobile device, a computer, a server or the like. The memory system 110 interworking with the host 102 may receive a command from the host 102, and store or output data in response to the received command.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory. The flash memory may have a 3-dimensional (3D) stack structure.

The memory system 110 may have a storage space including non-volatile memory cells.

In order to store data, requested by the host 102, in the storage space including the non-volatile memory cells, the memory system 110 may perform a mapping operation of connecting a file system used by the host 102 to the storage space including the non-volatile memory cells. For example, an address of data according to the file system used by the host 102 may be referred to as a logical address, and an address of data in the storage space including the non-volatile memory cells may be referred to as a physical address.

The memory system 110 may store memory map data in an internal storage space. In addition, the memory system 110 may include a map manager 136 for managing the memory map data.

When the host 102 provides the memory system 110 with a logical address along with a read request, the memory system 110 may search for a physical address, which corresponds to the logical address, based on the memory map data stored therein, and then output data, stored in the searched physical address, to the host 102.

If the host 102 can conduct the search for the physical address conducted by the memory system 110, time required for the memory system 110 to output data corresponding to the read request provided by the host 102 may be reduced. The host 102 may store the host map data or directly access the host map data in order to search for the physical address and provide the memory system 110 with the searched physical address.

Referring to FIG. 1, the memory system 110 may provide the host 102 with the memory map data.

Hereinafter, the map data provided by the memory system 110 and stored in the host 102 may be referred to as host map data. In addition, the map data stored in the memory system 110 may be referred to as memory map data.

When a logical address to be read is included in the host map data, the host 102 may provide the memory system 110 with a physical address obtained by referring to the host map data. On the other hand, when the logical address to be read is not included in the host map data, the host 102 may provide the memory system 110 with the logical address, and the memory system 110 may access the internal storage space by referring to the memory map data.

Since the host 102 can directly conduct the search for the physical address corresponding to the logical address included in the host map data, access performance of the memory system 110 may be improved as the probability that the logical address to be read by the host 102 is included in the host map data increases. Accordingly, the map manager 136 may provide the host 102 with memory map data, including a logical address expected to be frequently read by the host 102, among the memory map data in order to improve read operation performance. The host 102 may store the memory map data, obtained from the memory system 110, in an internal host cache 106.

The memory map data may include a plurality of map pieces. Each of the map pieces, which is a minimum unit of map data, may include corresponding relationship information of one logical address and one physical address.

The map manager 136 may provide the host 102 with the memory map data in units of memory map segments. Each of the memory map segments may include a plurality of map pieces for consecutive logical addresses. FIG. 1 illustrates a memory map segment M_SEGMENT provided to the host 102. The host 102 may store the memory map segment obtained from the memory system 110 in the host cache 106. The map segment stored in the host cache 106 may be referred to as a host map segment. FIG. 1 illustrates a host map segment H_SEGMENT stored in the host cache 106.

The memory map data stored in the memory system 110 may be changed. For example, when the memory system 110 updates data, which is stored in a specific physical region, in response to a command from the host 102 or moves and stores the data into another physical region through an internal operation, a map piece corresponding to a logical address of the data may be updated. Even though a map piece included in a specific memory map segment is changed, the changed map piece may not be reflected in a host map segment corresponding to the memory map segment. A portion indicated by a dot pattern in the host map segment H_SEGMENT illustrated in FIG. 1 shows a portion in which the changed map piece is not reflected.

When the host 102 converts a logical address into a physical address by using a host map segment in which the changed map piece is not reflected, and accesses the memory system 110 based on the physical address, the host 102 may access data that is not updated. Hereinafter, a method of accessing latest data of the memory system 110 without error by the host 102 may be provided.

According to an embodiment, when a mapping relationship included in the memory map segment is changed, the memory system 110 may provide the host 102 with a portion of the changed memory map data to support the host 102 to update the host map data stored in the host cache 106.

Structures and operations of a memory system 110 according to an embodiment are described in detail with reference to FIGS. 2 to 14.

Figure 2:
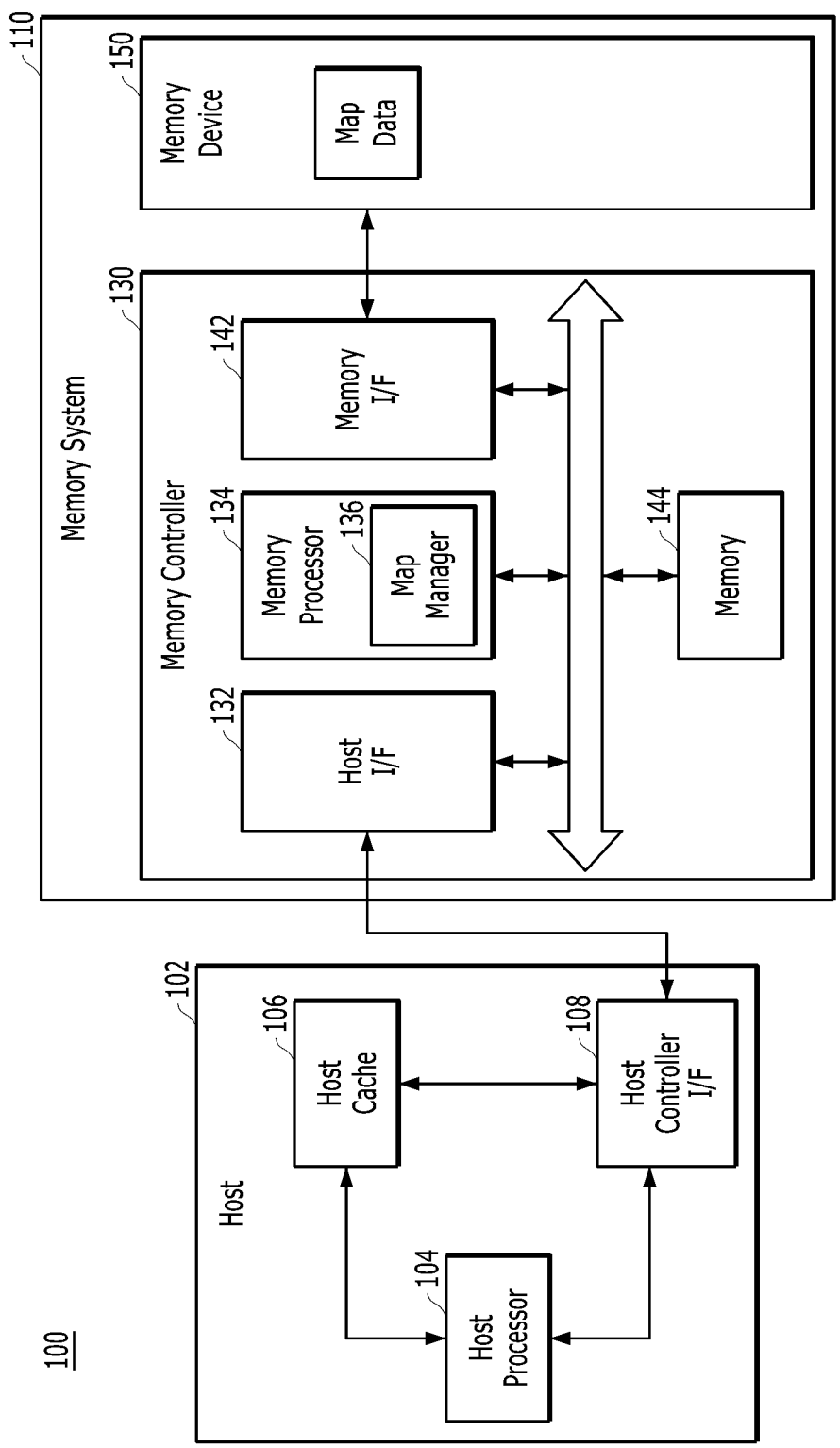
FIG. 2 is a diagram schematically illustrating an example of a data processing system including a memory system in accordance with an embodiment of the present disclosure.

FIG. 2 is a diagram schematically illustrating an example of a data processing system 100 including the memory system 110 in accordance with an embodiment of the present disclosure.

A host 102 and the memory system 110 illustrated in FIG. 2 correspond to the host 102 and the memory system 110 described with reference to FIG. 1.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 ... each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may store memory map data between a logical address and a physical address.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a memory processor 134, a memory I/F 142, and a memory 144 all operatively coupled via an internal bus.

The host I/F 132 may be configured to process a command and data of the host 102, and may communicate with the host 102 through one or more of various communication standards or interfaces such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host 102.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the memory processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The memory 144 may serve as an operating memory of the memory system 110 and the memory controller 130, and store data for driving the memory system 110 and the memory controller 130. The memory controller 130 may control the memory device 150 to perform read, program and erase operations in response to a request from the host 102. The memory controller 130 may provide the host 102 with data read from the memory device 150, and store data provided by the host 102 in the memory device 150. The memory 144 may store data necessary for the memory controller 130 and the memory device 150 to perform these operations. For example, the memory 144 may store a read count for each logical address region and a logical address region queue. In addition, the memory 144 may cache a portion of the memory map data.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 illustrates the memory 144 disposed within the controller 130. In an embodiment, the memory 144 may be implemented as an external volatile memory device, and the memory 144 may have a memory interface for inputting and outputting data to and from the controller 130.

The memory processor 134 may drive firmware to control overall operation of the memory system 110. The firmware may be referred to as a flash translation layer (FTL). In addition, the memory processor 134 may be implemented as a microprocessor or a central processing unit (CPU).

For example, the memory processor 134 may perform an operation requested by the host 102. The memory processor 134 may perform a foreground operation as a command operation corresponding to a request received from the host 102. For example, the memory processor 134 may perform a write operation corresponding to a write request, a read operation corresponding to a read request, an erase operation corresponding to an erase request, and the like. As a first example of the read operation, the memory processor 134 may access the memory device 150 with reference to a logical address provided by the host 102 and memory map data. As a second example of the read operation, the memory processor 134 may access the memory device 150 based on a physical address provided by the host 102.

The memory controller 130 may perform a background operation on the memory device 150 through the memory processor 134 implemented as the microprocessor or the central processing unit (CPU). For example, the background operation on the memory device 150 may include a garbage collection (GC) operation, a wear leveling (WL) operation, a map flush operation, a bad block management operation, and the like.

The memory processor 134 may include a map manager 136. The map manager 136 may predict a logical address region to be frequently read from a logical address space 602, and provide the host 102 with a memory map segment corresponding to the logical address region.

The host 102 may include a host processor 104, a host cache 106 and a host controller interface 108.

The host 102 may include a higher-performance host processor 104 and a larger-capacity host cache 106 than the memory system 110 interworking with the host 102. Unlike the memory system 110, the host processor 104 and the host cache 106 included in the host 102 may have less space restrictions, and be upgraded in terms of hardware, if necessary. Accordingly, in order to increase operational efficiency of the memory system 110, a resource of the host 102 may be utilized.

According to an embodiment, a storage space of the host cache 106 included in the host 102 may be tens to thousands of times larger than that of the memory 144 that the memory controller 130 can use. Accordingly, the memory system 110 may transmit the memory map data used by the memory controller 130 to the host cache 106 included in the host 102, and enable the host cache 106 to be used as a cache memory for an address conversion operation performed by the memory system 110. In this case, the host 102 may not transmit a logical address together with a command to the memory system 110, but may convert the logical address into a physical address based on host map data stored in the host cache 106, and then transmit the physical address along with the command to the memory system 110. The memory system 110 may omit the operation of converting the logical address into the physical address, and access the memory device 150 based on the transmitted physical address. In this case, the memory controller 130 may alleviate the aforementioned operational burden occurring while the memory controller 130 uses the memory 144, and thus the operational efficiency of the memory system 110 may increase greatly.

Even though the memory system 110 transmits the memory map data to the host 102, the memory system 110 may manage the memory map data, for example, update, delete or generate the memory map data. The memory controller 130 included in the memory system 110 may perform a background operation, such as a garbage collection operation and a wear leveling operation, according to operating states of the memory device 150, and determine a physical location, i.e., a physical address, in which data transmitted from the host 102 is stored in the memory device 150. Thus, the physical address of the data in the memory device 150 may be changed.

In other words, when the memory system 110 determines that it is necessary to correct or update the host map data, transmitted to the host 102, in the process of managing the memory map data, the memory system 110 may request host 102 to update the host map data. The host 102 may update the host map data stored in the host cache 106, in response to the request of the memory system 110. Accordingly, the host map data may maintain a latest state, and even though the host controller interface 108 converts an address value to be transmitted to the memory system 110 by using the host map data, there may be no problem with the operation.

According to an embodiment, the host map data may include L2P map data for checking a physical address corresponding to a logical address. Meta data representing a relationship between a logical address and a physical address may include L2P map data for checking the physical address corresponding to the logical address and P2L map data for checking the logical address corresponding to the physical address. Out of these map data, the host map data may include the L2P map data. The P2L map data may be mainly used for an internal operation of the memory system 110, and not be used for an operation of storing data in the memory system 110 by the host 102 or reading data corresponding to a specific logical address from the memory system 110. According to an embodiment, the memory system 110 may not transmit the P2L map data to the host 102.

The memory controller 130 included in the memory system 110 may store the L2P map data or the P2L map data in the memory device 150 while managing, i.e., generating, deleting or updating, the L2P map data or the P2L map data. Since the host cache 106 included in the host 102 is a volatile memory device, the host map data may disappear when an event such as discontinuation of power supplied to the host 102 and the memory system 110 occurs. Accordingly, the memory controller 130 included in the memory system 110 may not only maintain the host map data in the latest state, but also store the latest L2P map data or P2L map data in the memory device 150.

Figure 3:
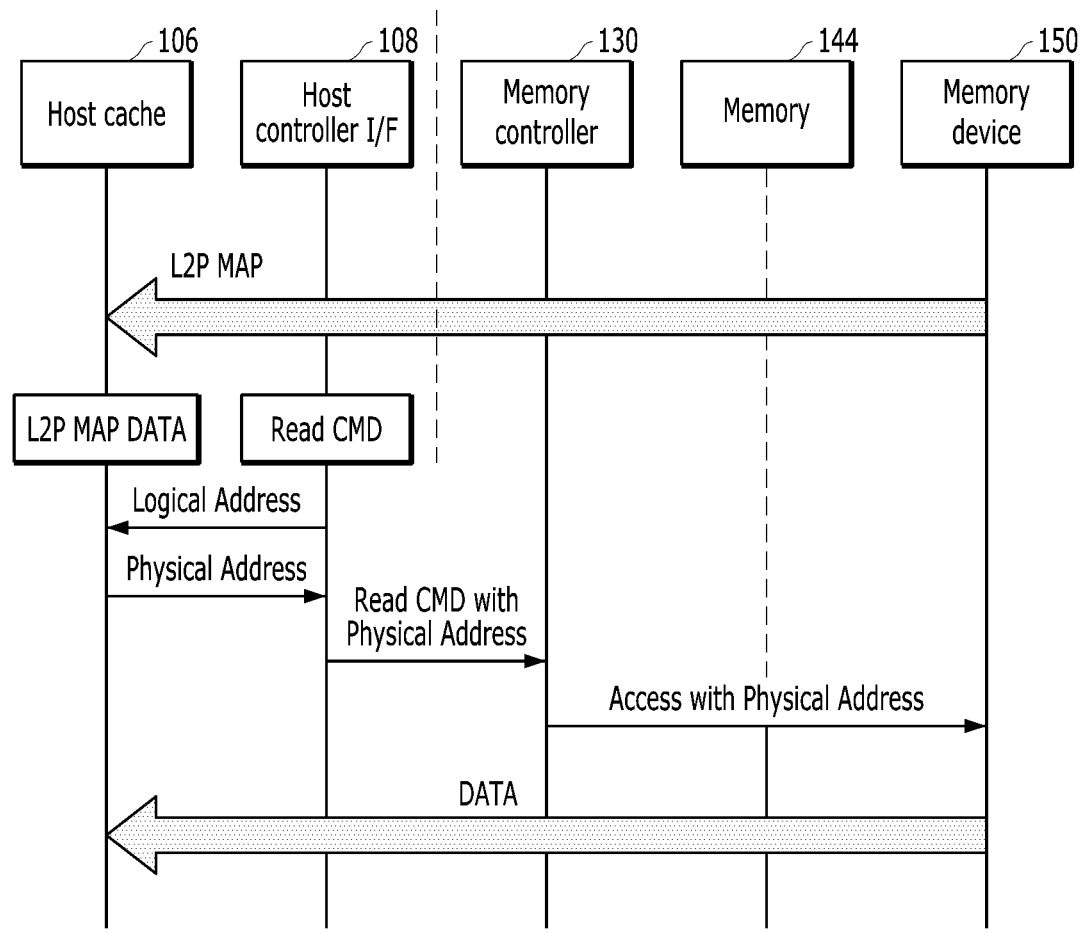
FIG. 3 is a diagram illustrating an operation of reading data, stored in a memory system, by a host when host map data is stored in a host cache included in the host.

FIG. 3 is a diagram illustrating an operation of reading data, stored in the memory system 110, by the host 102 when host map data is stored in the host cache 106 included in the host 102 according to an embodiment of the present disclosure.

Power may be supplied to the host 102 and the memory system 110, and the host 102 and the memory system 110 may interwork with each other. When the host 102 and the memory system 110 interwork with each other, memory map data L2P MAP stored in the memory device 150 may be transmitted to the host cache 106.

When a read command is generated by the host processor 104 included in the host 102, the read command may be transmitted to the host controller interface 108. After receiving the read command, the host controller interface 108 may transmit a logical address corresponding to the read command to the host cache 106. Based on the host map data L2P MAP stored in the host cache 106, the host controller interface 108 may recognize a physical address corresponding to the logical address.

The host controller interface 108 may transmit the read command together with the physical address to the memory controller 130 included in the memory system 110. The memory controller 130 may access the memory device 150 based on the received read command and physical address. Data, stored in a location corresponding to the physical address, in the memory device 150 may be transmitted to the host cache 106.

The process of reading data from the memory device 150 including the non-volatile memory device may require more time than the process of reading data from the host cache 106, which is another non-volatile memory. In the above-described reading process, a process in which the memory controller 130 receives a logical address from the host 102 and searches for a physical address corresponding to the logical address may be omitted. In particular, in the process in which the memory controller 130 searches for the physical address, the operation of accessing the memory device 150 to read meta data may disappear. Accordingly, the process of reading data, stored in the memory system 110, by the host 102 may be accelerated.

Figure 4:
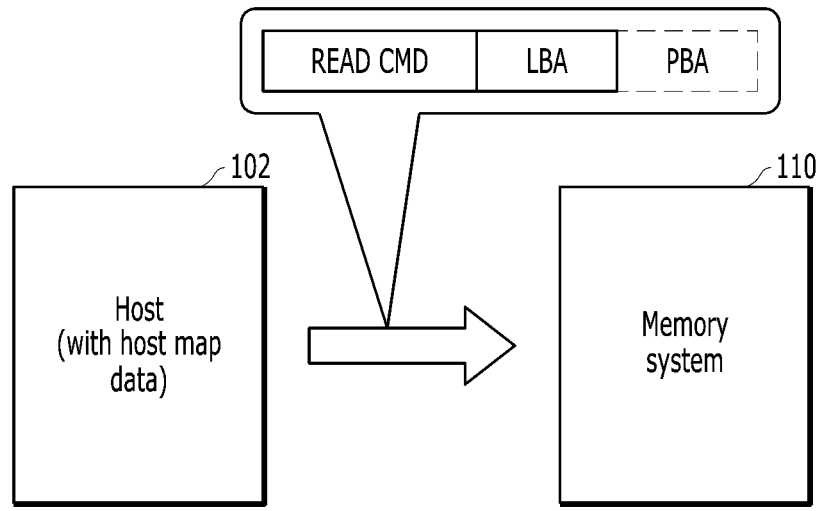
FIG. 4 is a diagram illustrating a first example of a transaction between a host and a memory system in a data processing system in accordance with an embodiment of the present disclosure.

FIG. 4 is a diagram illustrating a first example of a transaction between the host 102 and the memory system 110 in the data processing system 100 in accordance with an embodiment of the present disclosure.

Referring to FIG. 4, the host 102 storing host map data HOST MAP DATA may transmit a read command READ CMD including a logical address LBA and a physical address PBA to the memory system 110. When the physical address PBA corresponding to the logical address LBA corresponding to the read command READ CMD is present in the host map data, the host 102 may transmit the read command READ CMD including the logical address LBA and the physical address PBA to the memory system 110. However, when there the physical address PBA corresponding to the logical address LBA corresponding to the read command READ CMD is not present in the host map data, the host 102 may transmit the read command READ CMD, including only the logical address LBA without the physical address PBA, to the memory system 110.

Although FIG. 4 illustrates the read command READ CMD as an example, the present disclosure may also be applied to a write command or an erase command that the host 102 may transmit to the memory system 110, according to an embodiment.

Figure 5:
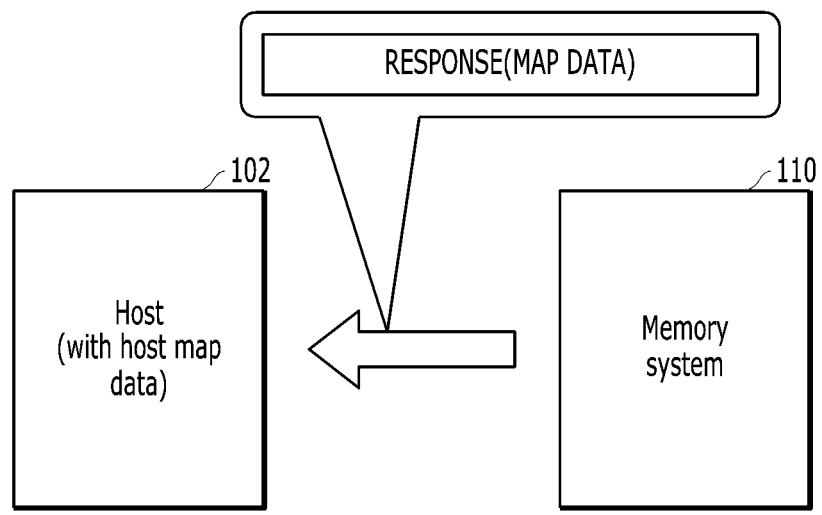
FIG. 5 is a diagram illustrating a second example of the transaction between the host and the memory system in the data processing system in accordance with an embodiment of the present disclosure.

FIG. 5 is a diagram illustrating a second example of a transaction between the host 102 and the memory system 110 in the data processing system 100 in accordance with an embodiment.

Referring to FIG. 5, the memory system 110 may transmit memory map data MAP DATA to the host 102. The memory system 110 may transmit the memory map data MAP DATA to the host 102 by using a response RESPONSE to a command of the host 102.

The memory system 110 and the host 102 may exchange a request and a response according to a format which is set based on a predetermined protocol. For example, the host 102 may provide the memory system 110 with a read buffer command to obtain data buffered in the memory 144. The memory system 110 may transmit the memory map data MAP DATA, which is buffered in the memory 144, to the host 102 as the response RESPONSE to the read buffer command.

Figure 6:
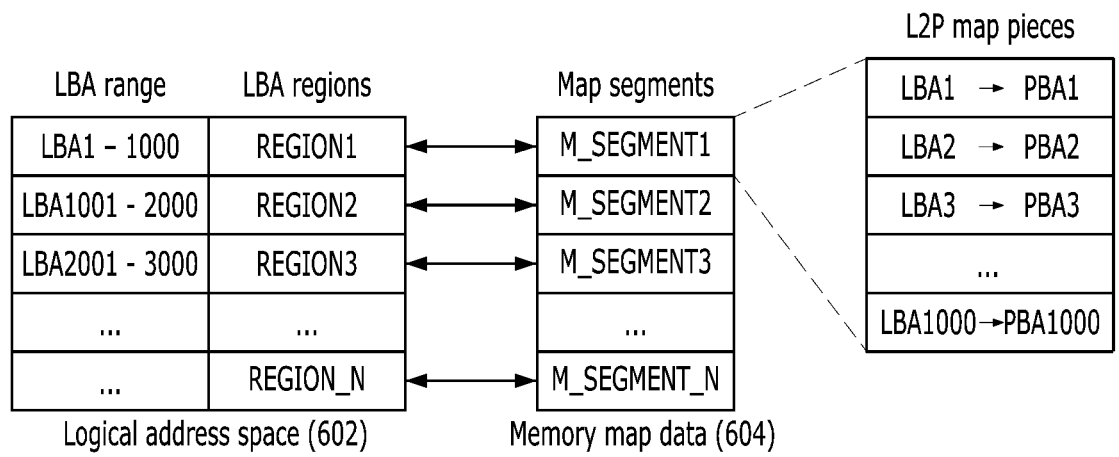
FIG. 6 is a diagram illustrating memory map data stored in a memory system in accordance with an embodiment of the present disclosure.

FIG. 6 is a diagram illustrating memory map data stored in the memory system 110 according to an embodiment of the present transaction.

FIG. 6 illustrates the logical address space 602 and memory map data 604.

The logical address space 602 may refer to a logical address range used in a file system of the host 102. The logical address space 602 may include a plurality of logical address regions. In an example of FIG. 6, the logical address space 602 may include a total of N logical address regions of first to $N^{th}$ regions REGION1 to REGION_N. Each of the plurality of logical address regions may include consecutive logical addresses. For example, the first region REGION1 may include LBA1 to LBA1000, the second region REGION2 may include LBA1001 to LBA2000, and the third region REGION3 may include LBA2001 to LBA3000.

The memory map data 604 may be the map data stored in the memory system 110. For example, the memory map data 604 may include entire map data of the logical address space 602. The memory map data 604 may include a plurality of memory map segments. In the example of FIG. 6, the memory map data 604 may include a total of N memory map segments of first to $N^{th}$ memory map segments M_SEG-MENT1 to M_SEGMENT_N. The N memory map segments may correspond to the N logical address regions. Each of the memory map segments may include a plurality of map pieces indicating mapping relationships between logical addresses and physical addresses included in a corresponding logical address region. In the example of FIG. 6, the first memory map segment M_SEGMENT1 may include 1,000 map pieces including mapping relationships among the logical addresses LBA1 to LBA1000 and corresponding physical addresses PBA1 to PBA1000.

If the memory system 110 provides the host 102 with all of the memory map data stored therein and the host 102 can store all the memory map data, the memory system 110 does not need to selectively provide a part of the memory map data. However, it may be difficult for the host 102 to allocate a storage space in the memory in order to store all of the memory map data managed by the memory system 110. Accordingly, the memory system 110 may selectively provide the host 102 with some of the memory map data.

According to spatial regionality and temporal regionality of the memory, a recently frequently accessed logical address and logical addresses adjacent thereto may be frequently accessed in the future. Accordingly, the map manager 136 may predict a logical address region to be frequently accessed, based on a read tendency of the host 102 for each logical address region.

The map manager 136 may provide the host 102 with hint information on a memory map segment corresponding to a logical address region predicted to be frequently read among a plurality of map segments. The host 102 may provide the memory system 110 with a read buffer command to obtain the memory map segment, in response to the hint information. The memory system 110 may provide the host 102 with the memory map segment in response to the read buffer command.

The host 102 may store the memory map segment as a host map segment in the host cache 106. The host 102 may use the host map segment stored in the host cache 106 and convert the logical address into a physical address, in order to access the memory system 110.

After updating the memory map segment, the map manager 136 may support the host 102 to update the corresponding host map segment. When the host map segment is updated, the host 102 may access a latest data of the memory system 110 by using the host map segment.

When the map manager 136 has to provide the host 102 with the entire updated memory map segment in order to update the corresponding host map segment whenever the memory map segment is updated, the performance of the memory system 110 may be degraded due to a large amount of data transmission.

According to an embodiment, when providing a response to a command of the host 102, the map manager 136 may provide the host 102 with a changed map piece together with the response. The host 102 may obtain the changed map piece from the memory system 110, and update a host map segment. According to an embodiment, an amount of data transmission for updating the host map segment may be reduced. The memory system 110 may keep the host map segment in a latest state without degrading the performance thereof.

Figure 7:
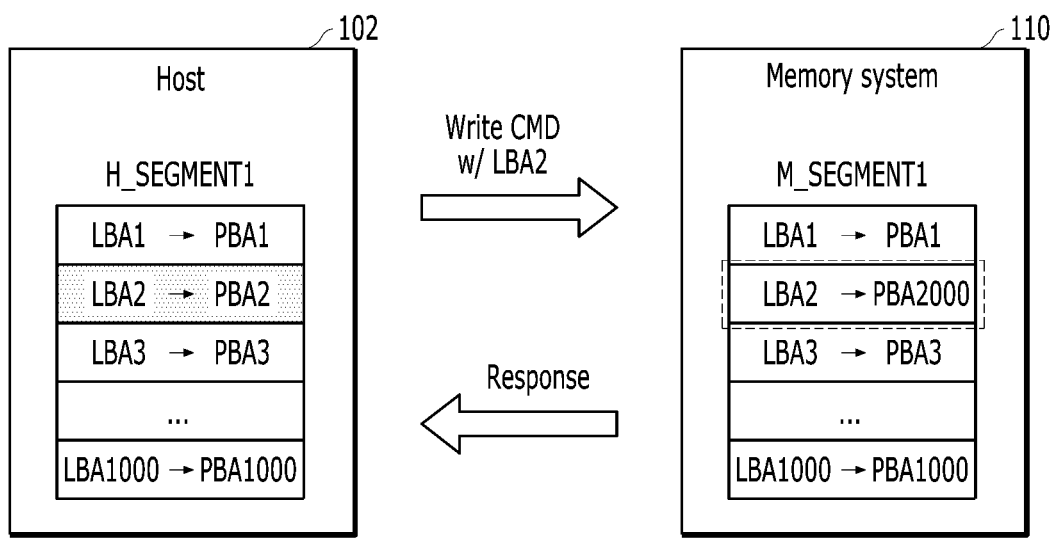
FIG. 7 is a diagram illustrating a first example of a method of updating a host map segment in accordance with an embodiment of the present disclosure.

FIG. 7 is a diagram illustrating a first example of a method of updating a host map segment according to an embodiment of the present disclosure.

FIG. 7 illustrates a first memory map segment M_SEGMENT1 stored in the memory system 110 and a first host map segment H_SEGMENT1 stored in the host 102. The first memory map segment M_SEGMENT1 and the first host map segment H_SEGMENT1 correspond to each other.

In an example of FIG. 7, the host 102 may provide the memory system 110 with a write command for a second logical address LBA2. The memory processor 134 may perform a write operation on the second logical address LBA2 in response to the write command, and convert a second physical address PBA2 corresponding to the second logical address LBA2 into a $2000^{th}$ physical address PBA2000. As a map piece for the second logical address LBA2 is changed, the first memory map segment M_SEGMENT1 may be updated. A region indicated by a broken line in FIG. 7 indicates a changed map piece.

When the changed map piece is not reflected in the first host map segment H_SEGMENT1, it is difficult for the host 102 to perform an address conversion operation using the first host map segment H_SEGMENT1. For example, when the host 102 trusts the first host map segment H_SEGMENT1 and performs the address conversion operation on the second logical address LBA2, the host 102 may access previous data rather than latest data.

The map manager 136 may provide the host 102 with a response including the changed map piece to a command so that the host 102 may keep the host map segment in a latest state.

Figure 8:
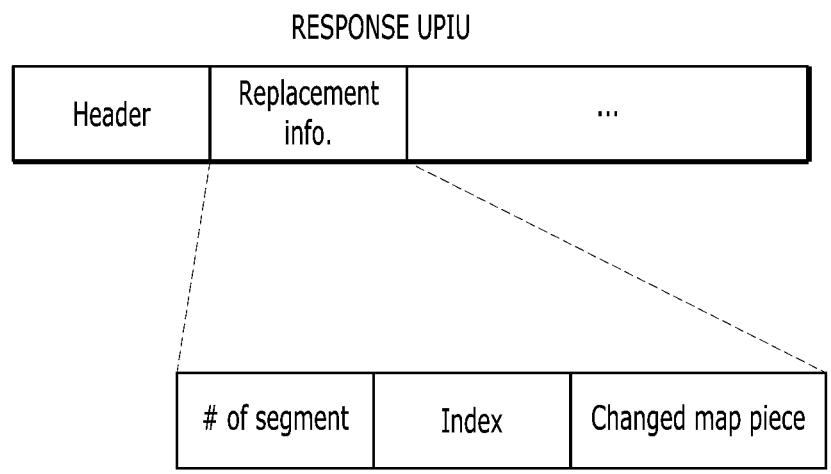
FIG. 8 is a diagram illustrating a first format of a response provided to a host by a memory system in accordance with an embodiment of the present disclosure.

FIG. 8 is a diagram illustrating a first format of a response provided to the host 102 by the memory system 110 in accordance with an embodiment of the present disclosure.

When the memory system 110 communicates with the host 102 based on a UFS interface protocol, the memory system 110 may provide the host 102 with a response by using a response UFS protocol information unit (UPIU). Referring to FIG. 8, the response UPIU may include a header and replacement information. The replacement information may include changed map piece information, a host map segment number (# of segment) to which the map piece information belongs, and an index indicating a location of the map piece information in the host map segment.

The host 102 may identify that a UPIU provided from the memory system 110 is a response UPIU, based on a header of the UPIU, and obtain the following replacement information. The host 102 may reflect a map piece, which is changed in the memory system 110, in a host map segment by using the replacement information. Depending on implementations, the map manager 136 may request the host 102 to update one or more host map segments by including one or more pieces of replacement information in the response UPIU and providing the host 102 with the response UPIU including the replacement information.

The first format of a response for the map manager 136 to provide a changed map piece has been described with reference to FIG. 8. However, the present disclosure is not limited thereto. For example, when the size of the response UPIU is limited by the standard, the map manager 136 may not provide the host 102 with a predetermined number or more of map pieces at once by using the response UPIU. When a plurality of map pieces are changed, the map manager 136 may provide the host 102 with the plurality of map pieces at once by using a response in a format different from that of the response UPIU.

Figure 9:
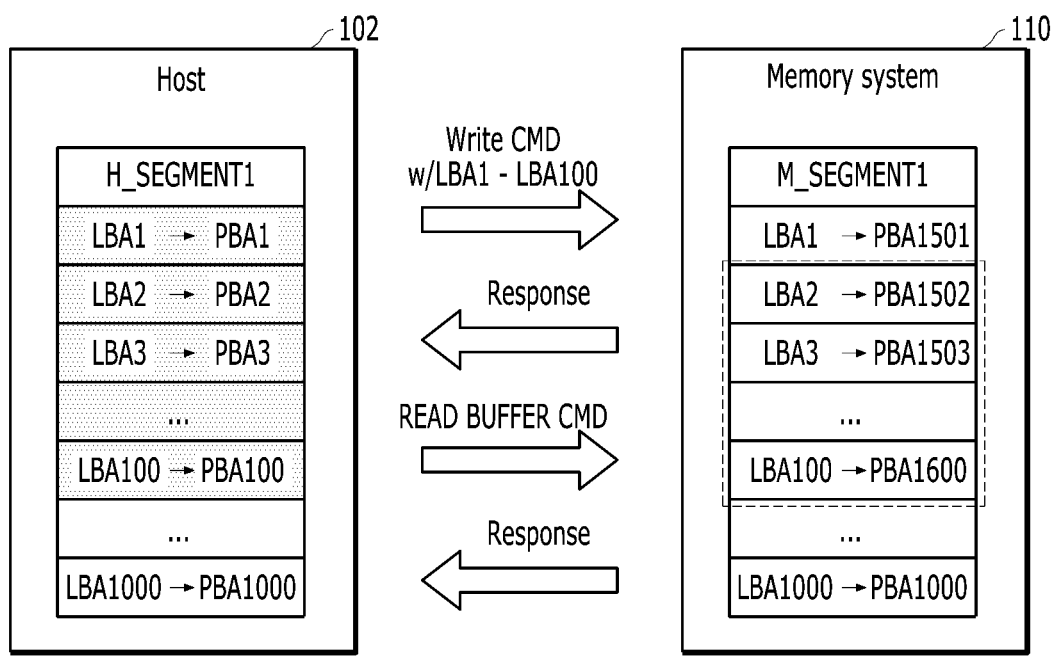
FIG. 9 is a diagram illustrating a second example of the method of updating the host map segment in accordance with an embodiment of the present disclosure.

FIG. 9 is a diagram illustrating a second example of the method of updating the host map segment according to an embodiment of the present disclosure.

FIG. 9 illustrates a first memory map segment M_SEGMENT1 stored in the memory system 110 and a first host map segment H_SEGMENT1 stored in the host 102.

In an example of FIG. 9, the host 102 may provide the memory system 110 with a write command for first to $100^{th}$ logical addresses LBA1 to LBA100. While the memory processor 134 performs a write operation on the first to $100^{th}$ logical addresses LBA1 to LBA100 in response to the write command, physical addresses corresponding to the first to $100^{th}$ logical addresses LBA1 to LBA100 may be changed to $1501^{st}$ to $1600^{th}$ physical addresses PBA1501 to PBA1600. The map manager 136 may update the first memory map segment M_SEGMENT1 because map pieces for the first to $100^{th}$ logical addresses LBA1 to LBA100 have been changed. Regions indicated by broken lines in FIG. 9 indicate the changed map pieces.

The map manager 136 may first provide the host 102 with hint information on a memory map segment including the changed map pieces as a response to the host 102, in order to provide the host 102 with a predetermined number or more of the changed map pieces at once. The host 102 may provide the memory system 110 with a read buffer command to obtain the changed map pieces, in response to the response. The map manager 136 may provide the host 102 with the changed map pieces as a response to the read buffer command.

Figure 10:
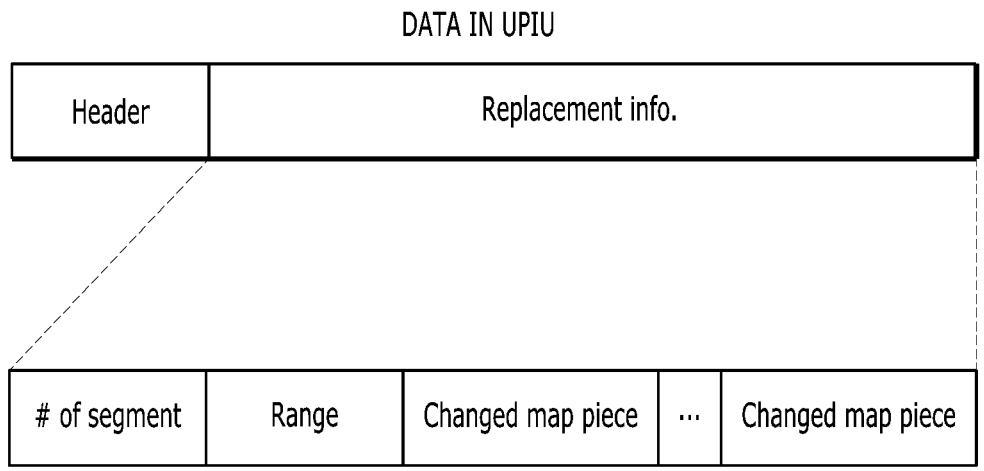
FIG. 10 is a diagram illustrating a second format of the response provided to the host by the memory system in accordance with an embodiment of the present disclosure.

FIG. 10 is a diagram illustrating a second format of the response provided to the host 102 by the memory system 110 in accordance with an embodiment of the present disclosure.

When the memory system 110 communicates with the host 102 based on a UFS interface protocol, the memory system 110 may provide the host 102 with a response by using a data in UPIU in response to a read buffer command. Since the data in UPIU may have a larger size than a response UPIU, the data in UPIU may include a plurality of map pieces.

In the example of FIG. 10, the data in UPIU may include a header and replacement information. The replacement information may include changed map piece information, a host map segment number (# of segment) to which the map piece information belongs, and an index range (Range) of changed map pieces in the host map segment. The host 102 may identify that a UPIU provided from the memory system 110 is the data in UPIU, based on a header of the UPIU, and reflect the map pieces, which are changed in the memory system 110, in a corresponding host map segment by using the replacement information.

Until the memory system 110 changes map pieces, and then the host 102 obtains the changed map pieces from the memory system 110 to update a host map segment, the host map segment may still include the map pieces that are not updated. A method is proposed in which the host 102 may access a latest location of the memory system 110 even when the host 102 accesses the memory system 110 by using a previous host map segment.

Figure 11:
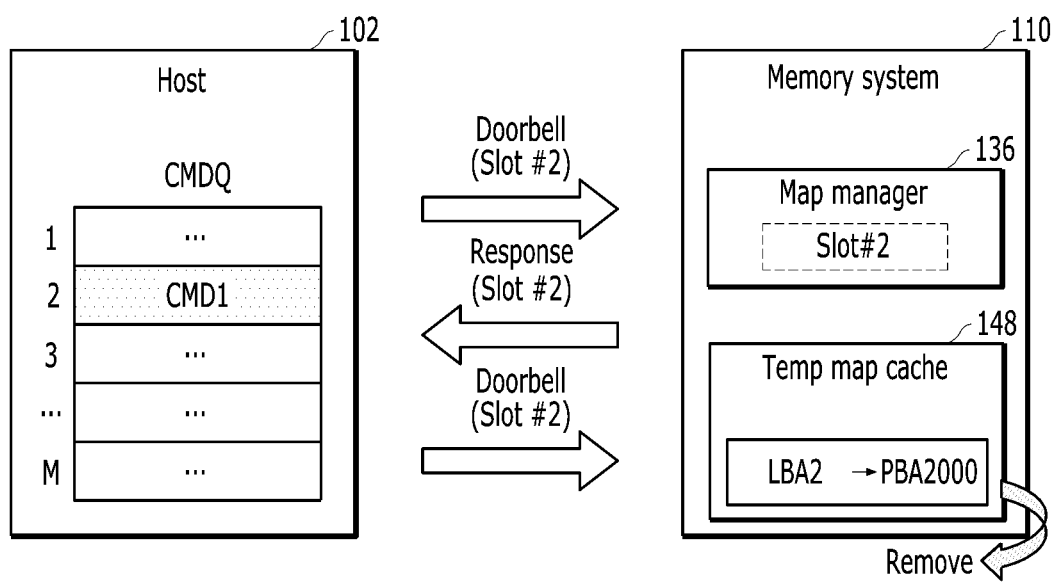
FIG. 11 is a diagram illustrating an operation of a data processing system in accordance with an embodiment of the present disclosure.

FIG. 11 is a diagram illustrating an operation of the data processing system 100 in accordance with an embodiment of the present disclosure.

FIG. 11 illustrates the host 102 and the memory system 110. The host 102 may include a command queue CMDQ for queuing commands provided to the memory system 110. The command queue CMDQ may include a plurality of command slots. In an example of FIG. 11, the command queue CMDQ may include M slots.

FIG. 11 illustrates a state in which a first command CMD1 is queued in a second slot. When the first command CMD1 is queued in the second slot, the host 102 may provide the memory system 110 with a doorbell signal to notify the memory system 110 that the first command CMD1 is queued in the second slot. The host interface 132 may obtain the first command CMD1 from the host 102 in response to the doorbell signal. The memory processor 134 may process the obtained command.

The map manager 136 may provide the host 102 with a response including replacement information to the first command CMD1. Upon receiving the response to the first command CMD1, the host 102 may update a host map segment by using the replacement information included in the response, and remove the first command CMD1 from the second slot. A map piece included in the replacement information may be a map piece changed while the first command CMD1 is processed, but the present disclosure is not limited thereto. For example, the replacement information may include a map piece changed while a host command received earlier than the first command CMD1 is processed or a map piece changed through an internal operation of the memory system 110.

According to the present embodiment, the map manager 136 may internally store the map piece included in the replacement information, until the host 102 updates the host map segment by using the replacement information. The memory system 110 may include a temporary map cache 148 for temporarily storing map pieces. The temporary map cache 148 may be included in the memory 144 described with reference to FIG. 2. In an example of FIG. 11, the temporary map cache 148 may temporarily store a map piece indicating a relationship between the second logical address LBA2 and the $2000^{th}$ physical address PBA2000. The map piece temporarily stored in the temporary map cache 148 may be the changed one that is provided to the host 102 through the replacement information and is to be utilized to update the host map segment.

Until the host 102 updates the host map segment including the second logical address LBA2, the host 102 may provide the memory system 110 with the second logical address LBA2 and a command including a previous physical address, in order to access the second logical address LBA2 of the memory system 110. In the case of the changed map piece representing the second logical address LBA2 and the $2000^{th}$ physical address PBA2000, the previous physical address may be the one provided before it is changed to the $2000^{th}$ physical address PBA2000.

According to the present embodiment, the host interface 132 may receive a command, a logical address and a physical address from the host 102. The memory processor 134 may determine whether a map piece corresponding to the logical address received from the host 102 is stored in the temporary map cache 148. That is, the memory processor 134 may determine whether the logical address provided from the host 102 is the changed map piece that is supposed to be updated in the host map segment. When the map piece is stored in the temporary map cache 148, the physical address received from the host 102 may be a previous physical address (e.g., the one before the $2000^{th}$ physical address PBA2000 in the case of the changed map piece representing the second logical address LBA2 and the $2000^{th}$ physical address PBA2000), and thus the memory processor 134 may ignore the physical address. The memory processor 134 may convert the logical address received from the host 102 into a latest physical address by using the map piece stored in the temporary map cache 148, and access latest data corresponding to the logical address. When the map piece is not stored in the temporary map cache 148, the memory processor 134 may access the latest data by using the physical address received from the host 102.

When the updating of the host map segment by the host 102 is completed, the map manager 136 may remove the map piece temporarily stored in the temporary map cache 148. If the memory system 110 has to provide the host 102 with a separate command and receive a response from the host 102 in order to check whether the updating of the host map segment by the host 102 is completed, the performance of the memory system 110 may be degraded.

According to an embodiment, when providing the host 102 with a response including replacement information, the map manager 136 may internally store slot number information corresponding to the response. The slot number information corresponding to the response may refer to number information on a slot in which a command corresponding to the response is queued. For example, when providing the host 102 with the response including the replacement information to the first command CMD1, the map manager 136 may store slot number "2".

The host 102 may update the host map data by using the replacement information included in the response to the first command CMD1, and then remove the first command CMD1 from the second slot. After the first command CMD1 is removed, the host 102 may queue a new command in the second slot, and provide the memory system 110 with a doorbell signal notifying that the new command is queued in the second slot. When obtaining the doorbell signal through the host interface 132, the map manager 136 may notice that the host 102 has completed the updating of the host map segment based on the response to the first command CMD1. The map manager 136 may remove the map piece stored in the temporary map cache 148, in response to the doorbell signal.

Hereinafter, an operation in which the host map segment stored in the host cache 106 is updated is described.

Figure 12:
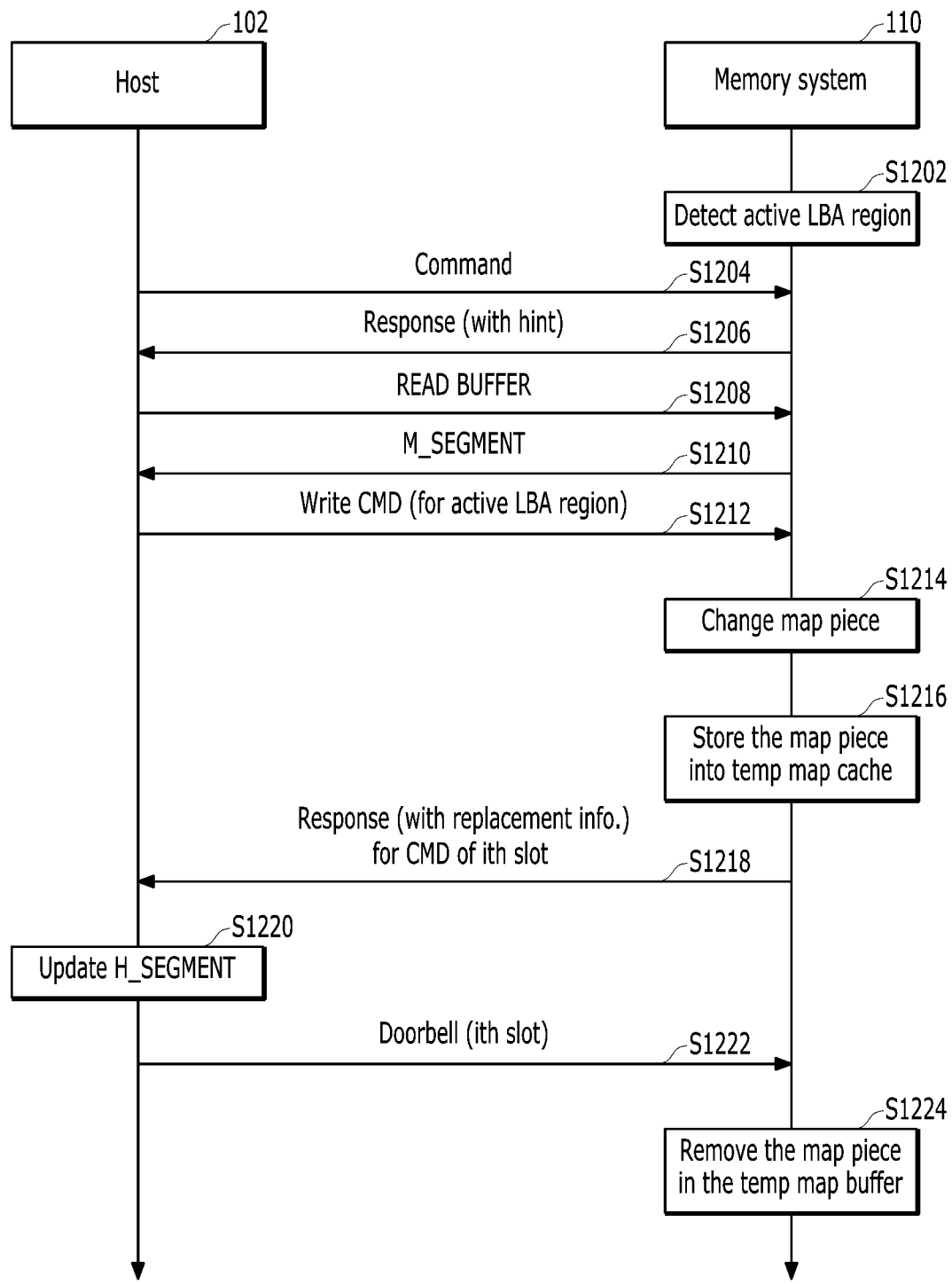
FIG. 12 is a diagram illustrating a transaction between a host and a memory system in accordance with an embodiment of the present disclosure.

FIG. 12 is a diagram illustrating a transaction between the host 102 and the memory system 110 in accordance with a first embodiment of the present disclosure.

Specifically, FIG. 12 illustrates a case in which the memory system 110 provides the host 102 with a map piece by using a response in the first format.

In operation S1202, the memory system 110 may detect an active logical address region. For example, the memory system 110 may detect a logical address region, which is frequently accessed over a threshold level, as the active logical address region.

In operation S1204, the host 102 may provide the memory system 110 with a command. The command in operation S1204 is not limited to a specific type of command. For example, the command may be a write command or a trim command that causes a change of the map piece, or a read command that does not cause the change of the map piece.

In operation S1206, the memory system 110 may provide the host 102 with a response corresponding to the command of the host 102 together with hint information on the detected active logical address region.

In operation S1208, the host 102 may provide the memory system 110 with a read buffer command for obtaining a memory map segment corresponding to the active logical address region, in response to the hint information.

In operation S1210, the memory system 110 may provide the host 102 with the memory map segment in response to the read buffer command. The host 102 may store the memory map segment as a host map segment in the host cache 106. The host 102 may convert a logical address included in the active logical address region into a physical address by using the host map segment stored in the host cache 106.

In operation S1212, the host 102 may provide the memory system 110 with a write command. The write command may be a write command for the active logical address region.

In operation S1214, the memory system 110 may change the map piece by changing a physical address corresponding to the logical address. The memory system 110 may perform a write operation on the changed physical address in response to the write command.

In operation S1216, the memory system 110 may cache the changed map piece in the temporary map cache 148.

In operation S1218, the memory system 110 may insert, in a response to a command of an $i^{th}$ slot, replacement information including the changed map piece and may provide the host 102 with the response including the replacement information. The command of the $i^{th}$ slot is not limited to the write command of operation S1212, and may be any command to which a response is provided after the map piece is changed.

In operation S1220, the host 102 may update the host map segment based on the replacement information received from the memory system 110.

In operation S1222, the host 102 may queue a new command in the $i^{th}$ slot, and provide the memory system 110 with a doorbell signal corresponding to the $i^{th}$ slot.

In operation S1224, the memory system 110 may detect that the host 102 has completed updating the host map segment based on the doorbell signal, and remove the changed map piece from the temporary map cache 148.

Figure 13:
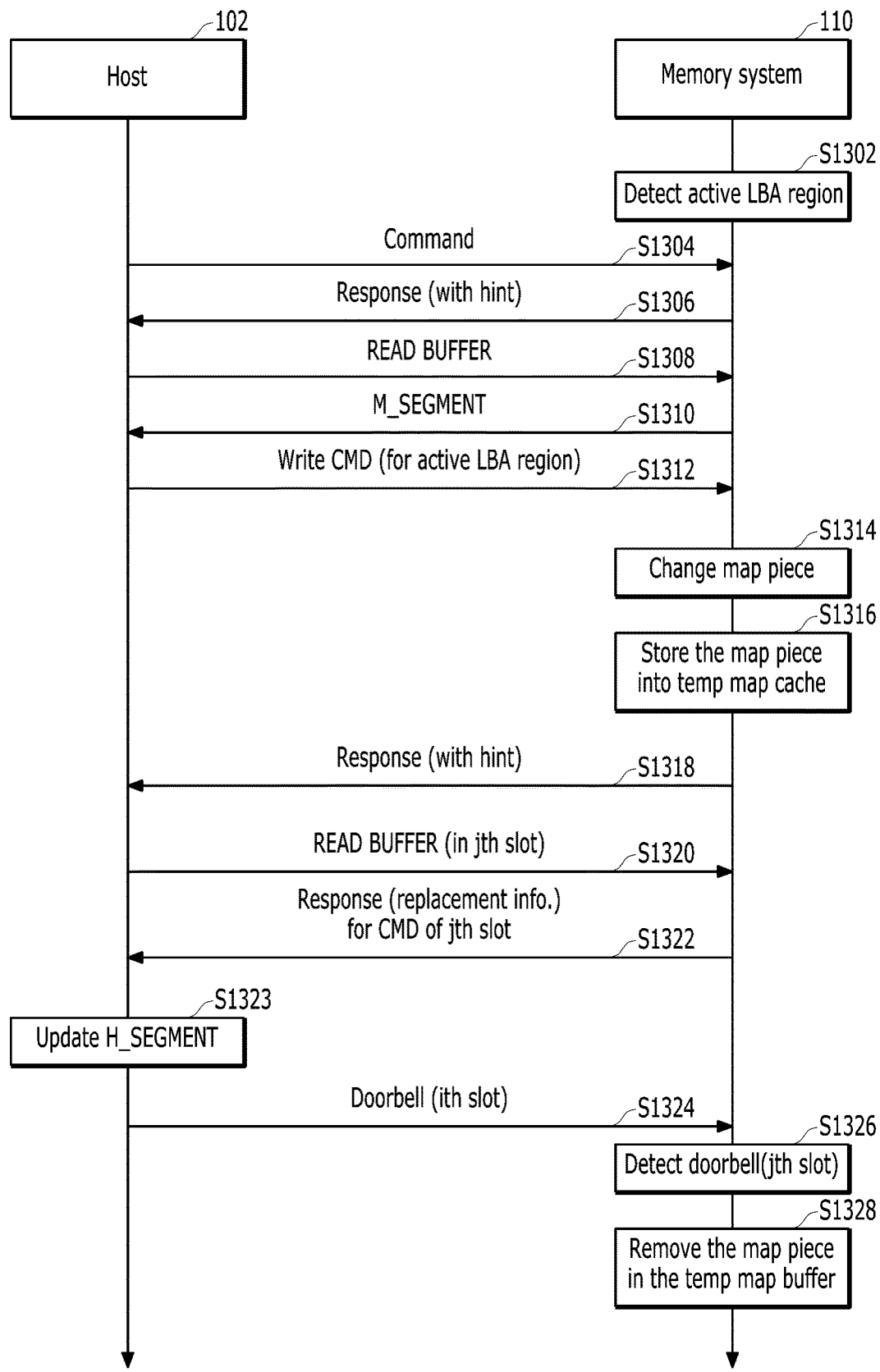
FIG. 13 is a diagram illustrating a transaction between a host and a memory system in accordance with another embodiment of the present disclosure.

FIG. 13 is a diagram illustrating a transaction between the host 102 and the memory system 110 in accordance with another embodiment of the present disclosure.

Specifically, FIG. 13 illustrates a case in which the memory system 110 provides the host 102 with map pieces by using a response in the second format.

In operations S1302, S1304, S1306, S1308 and S1310, the memory system 110 may detect an active logical address region, and provide the host 102 with a memory map segment of the active logical address region. Operations S1302, S1304, S1306, S1308 and S1310 may be the same as operations S1202, S1204, S1206, S1208 and S1210.

In operation S1312, the host 102 may provide the memory system 110 with a write command for the active logical address region. For example, the write command may be a write command for a plurality of consecutive logical addresses included in the active logical address region.

In operation S1314, the memory system 110 may change a plurality of map pieces included in the memory map segment, by changing physical addresses corresponding to the logical addresses. The memory system 110 may perform a write operation on the changed physical addresses in response to the write command.

In operation S1316, the memory system 110 may store the changed map pieces in the temporary map cache 148.

In operation S1318, the memory system 110 may provide the host 102 with a response to a command together with a hint signal indicating that a specific memory map segment has been updated. For example, the command may be the write command of operation S1312, but the type of the command is not limited.

In operation S1320, the host 102 may provide the memory system 110 with a read buffer command in response to the hint signal. For example, when the host 102 queues the read buffer command in a $j^{th}$ slot of the command queue CMDQ, and provides the memory system 110 with a doorbell signal for the $j^{th}$ slot, the memory system 110 may obtain the read buffer command from the $j^{th}$ slot.

In operation S1322, the memory system 110 may provide the host 102 with a response including replacement information including the plurality of map pieces, in response to the read buffer command. The response may correspond to the $j^{th}$ slot, and the memory system 110 may store $j^{th}$ slot information therein.

In operation S1323, the host 102 may update a host map segment based on the replacement information. After updating the host map segment, the host 102 may remove the read buffer command queued in the $j^{th}$ slot. The host 102 may queue a new read command in the $j^{th}$ slot from which the read buffer command is removed. In operation S1324, the host 102 may provide the memory system 110 with a doorbell signal for the $j^{th}$ slot.

In operation S1326, the memory system 110 may detect the doorbell signal for the $j^{th}$ slot. Based on the doorbell signal, the memory system 110 may notice that the host 102 has completed updating the host map segment in response to the response corresponding to the $j^{th}$ slot.

In operation S1328, the memory system 110 may remove the plurality of map pieces from the temporary map cache 148.

Hereinafter, a method by which the memory system 110 may access latest data in response to a read command received from the host 102 is described.

Figure 14:
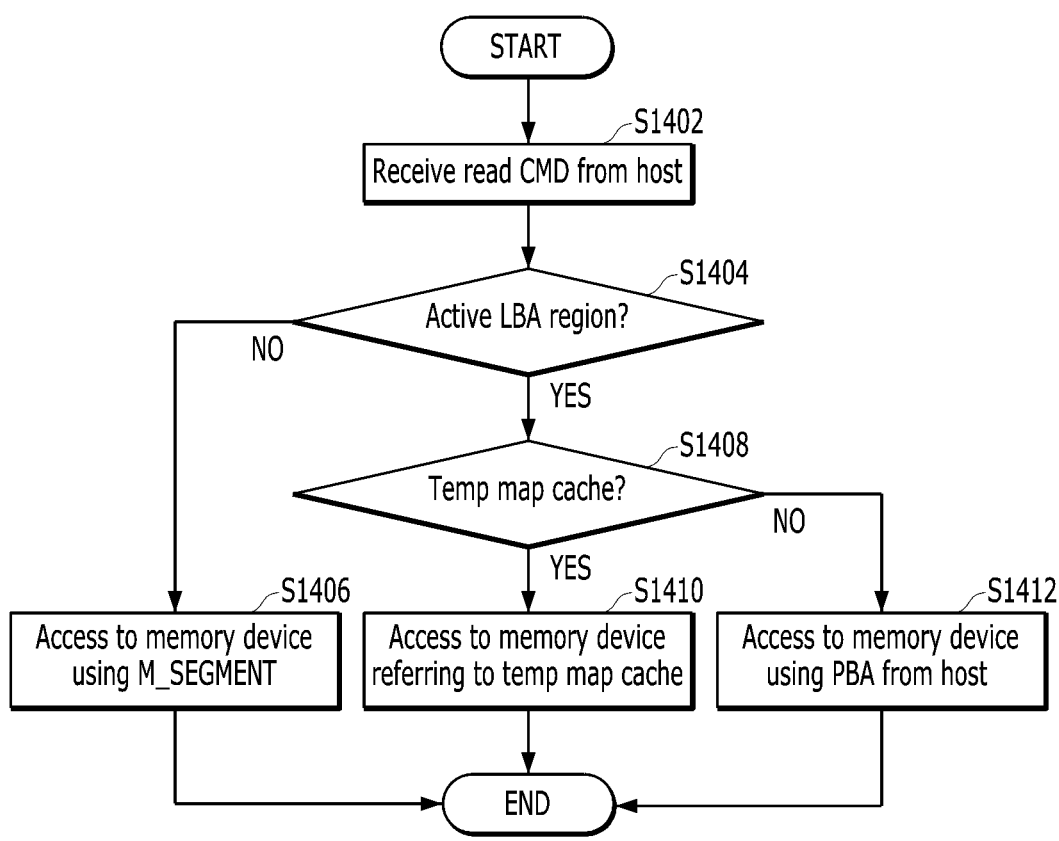
FIG. 14 is a diagram illustrating an operation of a memory system in accordance with an embodiment of the present disclosure.

FIG. 14 is a diagram illustrating an operation of the memory system 110 in accordance with an embodiment of the present disclosure.

In operation S1402, the memory system 110 may receive a read command from the host 102.

In operation S1404, the memory system 110 may determine whether the read command received from the host 102 is for an active logical address region. For example, when the read command is for the active logical address region, the host 102 may provide the memory system 110 with a physical address together with the read command and a logical address. When the read command is not for the active logical address region, the host 102 may provide the memory system 110 with only the read command and the logical address.

When the read command is not for the active logical address region (that is, "NO" in operation S1404), the memory system 110 may convert the logical address into a physical address by using a memory map segment stored therein, and then access the memory device 150 by using the physical address, in operation S1406.

When the read command is for the active logical address region (that is, "YES" in operation S1404), the memory system 110 may determine whether the logical address of the read command is stored in the temporary map cache 148, in operation S1408.

When the logical address of the read command is stored in the temporary map cache 148 (that is, "YES" in operation S1408), the physical address provided from the host 102 together with the logical address may be a previous physical address, and a physical address stored in the temporary map cache 148 may be a latest physical address. Accordingly, in operation S1410, the memory system 110 may convert the logical address into the physical address by referring to the temporary map cache 148, and access the memory device 150 by using the physical address.

When the logical address of the read command is not stored in the temporary map cache 148 (that is, "NO" in operation S1408), the physical address provided from the host 102 together with the logical address may be a latest physical address. Accordingly, in operation S1412, the memory system 110 may access the memory device 150 by using the physical address provided from the host 102.

According to an embodiment, when one or several map pieces included in a memory map segment are updated, the memory system 110 may insert the updated map pieces in a response to the host 102 and may provide the host 102 with the response including the updated map pieces. In this case, the memory system 110 may store the updated map pieces in the temporary map cache 148, and store a command queue CMDQ slot number of a slot in which a command queue corresponding to the response is queued. The host 102 may obtain the map pieces included in the response, update a host map segment, and remove a command corresponding to the slot number from the command queue CMDQ. When a new command is queued in a slot having the slot number of the command queue CMDQ, the host 102 may provide the memory system 110 with a doorbell signal. The memory system 110 may remove the updated map pieces from the temporary map cache 148 in response to the doorbell signal corresponding to the slot number.

According to an embodiment, the memory system 110 may enable the host 102 to perform an address conversion operation on a logical address region which is accessed frequently, and always access latest data by using a physical address received from the host 102 together with the logical address. The memory system 110 may provide the host 102 with only the changed map pieces in a corresponding memory map segment instead of providing the host 102 with the entire memory map segment in order to update a host map segment to a latest state. Thus, the workload for updating the host map segment may be reduced.

According to an embodiment, when receiving a physical address together with a logical address from the host 102, the memory system 110 may check whether the physical address is a latest physical address by searching only the temporary map cache 148. Changed map pieces may be stored in the temporary map cache 148, and the stored map pieces may be removed from the temporary map cache 148 when being reflected in a host map segment. Thus, the temporary map cache 148 may include a smaller amount of memory map data than an entire amount of the memory map data 604. Accordingly, the workload of the memory system 110 for checking whether the physical address received from the host 102 is the latest physical address may be reduced.

According to the embodiments of the present disclosure, it is possible to provide a memory system capable of causing a host to provide the memory system with a request including a physical address of data to be read from the memory system.

Although a memory system and an operating method thereof have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. A data processing system comprising:
a memory system configured to provide a host with a memory map segment including a plurality of map pieces, each of the plurality of map pieces including a mapping relationship between a logical address and a physical address; and
the host configured to store the memory map segment, which is provided from the memory system, as a host map segment and converting a logical address into a physical address by using the host map segment,
wherein the memory system is further configured to:
store, in a map cache, one or more changed map pieces among the plurality of map pieces,
insert the changed map pieces in a response to a first command of the host, and
provide the host with the response,
wherein the host is further configured to update the host map segment based on the changed map pieces provided through the response, and
wherein, when a read command from the host includes a logical address and a physical address, the memory system is further suitable for accessing a memory device by selectively using the physical address included in the read command according to whether the logical address included in the read command is stored in the map cache,
wherein the host includes a slot configured to queue the first command,
wherein the host is further configured to:
remove the first command from the slot after the updating of the host map segment,
queue a second command in the slot, and
provide the memory system with a doorbell signal indicating the slot, and
wherein the memory system is further configured to:
store identification of the slot, and
detect completion of the updating of the host map segment by receiving the doorbell signal.

2. The data processing system of claim 1, wherein, when the logical address included in the read command is not stored in the map cache, the memory system accesses the memory device by using the physical address included in the read command.

3. The data processing system of claim 1, wherein, when the logical address included in the read command is stored in the map cache, the memory system accesses the memory device by using a physical address that is converted from the logical address included in the read command based on the changed map pieces stored in the map cache.

4. The data processing system of claim 1, wherein the memory map segment corresponds to a logical address region that is frequently accessed over a threshold level.

5. The data processing system of claim 1, wherein the memory system inserts, together with the changed map pieces in the response, identification of the memory map segment and location information of the changed map pieces within the memory map segment.

6. The data processing system of claim 5, wherein the response has a format of a response UFS protocol information unit (UPIU).

7. The data processing system of claim 1, wherein the memory system is further configured to provide the host with hint information on the memory map segment including the changed map pieces to cause the host to provide the memory system with a read buffer command, as the first command, in response to the hint information.

8. The data processing system of claim 7, wherein the response has a format of a data in UFS protocol information unit (UPIU).

9. The memory system of claim 1, wherein the memory system notices that the host has completed the updating of the host map segment when a doorbell signal is received from the host.

10. The memory system of claim 9, wherein the doorbell signal indicates that the first command stored in a slot is removed and a second command is queued in the slot.

11. A memory system comprising:
a memory device configured to store data; and
a controller configured to:
provide a host with a memory map segment, which includes a plurality of map pieces, each of the plurality of map pieces including a mapping relationship between a logical address and a physical address, as a host map segment,
store, in a map cache, one or more changed map pieces among the plurality of map pieces,
cause the host to update the host map segment by inserting the changed map pieces in a response to a first command of the host and providing the host with the response, the host map segment being updated on the basis of the changed map pieces provided through the response, and
access, when a read command from the host includes a logical address and a physical address, a memory device by selectively using a physical address included in the read command according to whether the logical address included in the read command is stored in the map cache,
wherein the controller is further configured to:
store identification of a slot that is included in the host and queues the first command, and
detect completion of the updating of the host map segment by receiving a doorbell signal indicating the slot, and
wherein the doorbell signal is provided from the host when the first command is removed from the slot after the updating of the host map segment and a second command is queued in the slot.

12. The memory system of claim 11, wherein, when the logical address included in the read command is not stored in the map cache, the controller accesses the memory device by using the physical address included in the read command.

13. The memory system of claim 11, wherein, when the logical address included in the read command is stored in the map cache, the controller accesses the memory device by using a physical address that is converted from the logical address included in the read command based on the changed map pieces stored in the map cache.

14. The memory system of claim 11, wherein the memory map segment corresponds to a logical address region that is frequently accessed over a threshold level.

15. The memory system of claim 11, wherein the controller inserts, together with the changed map pieces in the response, identification of the memory map segment and location information of the changed map pieces within the memory map segment.

16. The memory system of claim 15, wherein the response has a format of a response UFS protocol information unit (UPIU).

17. The memory system of claim 11, wherein the controller is further configured to provide the host with hint information on the memory map segment including the changed map pieces to cause the host to provide the controller with a read buffer command, as the first command, in response to the hint information.

18. The memory system of claim 17, wherein the response has a format of a data in UFS protocol information unit (UPIU).

19. The memory system of claim 11, wherein the memory system notices that the host has completed the updating of the host map segment when a doorbell signal is received from the host.

20. The memory system of claim 19, wherein the doorbell signal indicates that the first command stored in a slot is removed and a second command is queued in the slot.

* * * * *